(12) United States Patent
Creusot

(10) Patent No.: US 10,489,665 B2
(45) Date of Patent: Nov. 26, 2019

(54) SYSTEMS AND METHODS FOR DETERMINING THE PRESENCE OF TRAFFIC CONTROL PERSONNEL AND TRAFFIC CONTROL SIGNAGE

(71) Applicant: GM GLOBAL TECHNOLOGY OPERATIONS LLC, Detroit, MI (US)

(72) Inventor: Clement Creusot, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 15/697,821

(22) Filed: Sep. 7, 2017

(65) Prior Publication Data

US 2017/0364759 A1    Dec. 21, 2017

(51) Int. Cl.
| | |
|---|---|
| *G06K 9/00* | (2006.01) |
| *G06K 9/62* | (2006.01) |
| *G06K 9/46* | (2006.01) |
| *G08G 1/0967* | (2006.01) |
| *G08G 1/095* | (2006.01) |
| *G08G 1/0955* | (2006.01) |
| *G08G 1/0962* | (2006.01) |
| *G08G 1/00* | (2006.01) |

(52) U.S. Cl.
CPC ..... *G06K 9/00825* (2013.01); *G06K 9/00369* (2013.01); *G06K 9/00805* (2013.01); *G06K 9/00818* (2013.01); *G06K 9/4628* (2013.01); *G06K 9/6273* (2013.01); *G08G 1/095* (2013.01); *G08G 1/0955* (2013.01); *G08G 1/09623* (2013.01); *G08G 1/096725* (2013.01); *G08G 1/202* (2013.01)

(58) Field of Classification Search
CPC .......... G06K 9/00825; G06K 9/00805; G08G 1/095; G08G 1/0955; G08G 1/09623; G08G 1/096725; G08G 1/202
USPC ....................................................... 701/117
See application file for complete search history.

(56) References Cited

U.S. PATENT DOCUMENTS

| | | | |
|---|---|---|---|
| 9,015,093 B1 * | 4/2015 | Commons .......... | G01C 21/3602 706/26 |
| 2016/0144867 A1 * | 5/2016 | Delp ................... | B60W 30/181 701/28 |
| 2017/0307735 A1 * | 10/2017 | Rohani ................ | G01S 7/417 |
| 2018/0341853 A1 * | 11/2018 | Nakfour .............. | G06N 3/08 |

* cited by examiner

*Primary Examiner* — Marthe Y Marc-Coleman
(74) *Attorney, Agent, or Firm* — Lorenz & Kopf, LLP

(57) ABSTRACT

Systems and method are provided for controlling a vehicle. In one embodiment, a determination is made that a traffic control person and a traffic control sign are present within the environment of the vehicle based on sensor data, such as optical camera data. The position and orientation of the traffic control sign relative to the traffic control person is determined, e.g., via lidar sensor data, and the validity of the traffic control person and the traffic control sign is determined based on the position and orientation of the traffic control sign.

17 Claims, 6 Drawing Sheets

Various sign orientations

SYSTEMS AND METHODS FOR DETERMINING THE PRESENCE OF TRAFFIC CONTROL PERSONNEL AND TRAFFIC CONTROL SIGNAGE

TECHNICAL FIELD

The present disclosure generally relates to autonomous vehicles, and more particularly relates to systems and methods for detecting the presence of traffic control personnel and related traffic control signs.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, in some instances, a traffic control person will control the flow of traffic at an intersection or other location using hand-held signs (e.g., "stop" or "slow" signs) in conjunction with various hand gestures. It would be desirable for autonomous vehicles to correctly detect and interpret such traffic control personnel and signage.

Accordingly, it is desirable to provide systems and methods for detecting the presence of traffic control personnel and related traffic control signs in autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a first vehicle. In one embodiment, a traffic control detection method includes receiving sensor data relating to an environment associated with a vehicle, determining that a traffic control person and a traffic control sign are present within the environment based on the sensor data, determining a position and an orientation of the traffic control sign relative to the traffic control person, and confirming the validity of the traffic control person and the traffic control sign based on the determined position and orientation.

In one embodiment, the sensor data includes lidar sensor returns, and at least one of the orientation and the position of the traffic control sign relative to the traffic control person is determined via the lidar sensor returns.

In one embodiment, determining that the traffic control person and the traffic control sign are present within the environment includes presenting the sensor data to a previously trained machine learning classifier.

In one embodiment, the machine learning classifier is a convolutional neural network.

In one embodiment, the machine learning classifier is trained using labeled images traffic control individuals, hand-held "stop" signs, and hand-held "slow" signs.

In one embodiment, confirming that the traffic control person and the traffic control sign are valid includes determining whether a lateral distance between the traffic control person and the traffic control sign is below a predetermined threshold.

In one embodiment, confirming that the traffic control person and the traffic control sign are valid includes determining the pose of the traffic control sign relative to the vehicle.

In one embodiment, determining that the traffic control person and the traffic control sign are valid includes determining the height of the traffic control sign relative to the traffic control person.

A system for controlling a vehicle in accordance with one embodiment includes a traffic control person detection module and a position determination module. The traffic control person detection module, including a processor, is configured to receive sensor data relating to an environment associated with a vehicle and determine that a traffic control person and a traffic control sign are present within the environment based on the sensor data. The position determination module is configured to determine a position and an orientation of the traffic control sign relative to the traffic control person, and confirm the validity of the traffic control person and the traffic control sign based on the determined position and orientation.

In one embodiment, the sensor data includes lidar sensor returns, and at least one of the orientation and the position of the traffic control sign relative to the traffic control person is determined via the lidar sensor returns.

In one embodiment, the traffic control person detection module determines that the traffic control person and the traffic control sign are present within the environment by presenting the sensor data to a previously trained machine learning classifier.

In one embodiment, the machine learning classifier is a convolutional neural network.

In one embodiment, the machine learning classifier is trained using labeled images traffic control individuals, hand-held "stop" signs, and hand-held "slow" signs.

In one embodiment, the position determination module confirms the validity of the traffic control person and the traffic control sign in part by determining whether a lateral distance between the traffic control person and the traffic control sign is below a predetermined threshold.

In one embodiment, the position determination module confirms the validity of the traffic control person and the traffic control sign in part by determining the pose of the traffic control sign relative to the vehicle.

In one embodiment, the position determination module confirms the validity of the traffic control person and the traffic control sign in part by determining the height of the traffic control sign relative to the traffic control person.

An autonomous vehicle in accordance with one embodiment includes at least one sensor that provides sensor data, and a controller that, by a processor and based on the sensor data: receives sensor data relating to an environment associated with a vehicle; determines that a traffic control person and a traffic control sign are present within the environment based on the sensor data; determines a position and an orientation of the traffic control sign relative to the traffic control person; and confirms the validity of the traffic control person and the traffic control sign based on the determined position and orientation.

In one embodiment, the sensor data includes lidar sensor returns, and at least one of the orientation and the position of the traffic control sign relative to the traffic control person is determined via the lidar sensor returns.

In one embodiment, the traffic control person detection module determines that the traffic control person and the traffic control sign are present within the environment by presenting the sensor data to a convolutional neural network that has been trained by a set of labeled images of example traffic control signs and example traffic control people.

In one embodiment, the validity of the traffic control person and the traffic control sign is determined by performing at least one of: determining whether a lateral distance between the traffic control person and the traffic control sign is below a predetermined threshold; determining the pose of the traffic control sign relative to the vehicle; and determining the height of the traffic control sign relative to the traffic control person.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
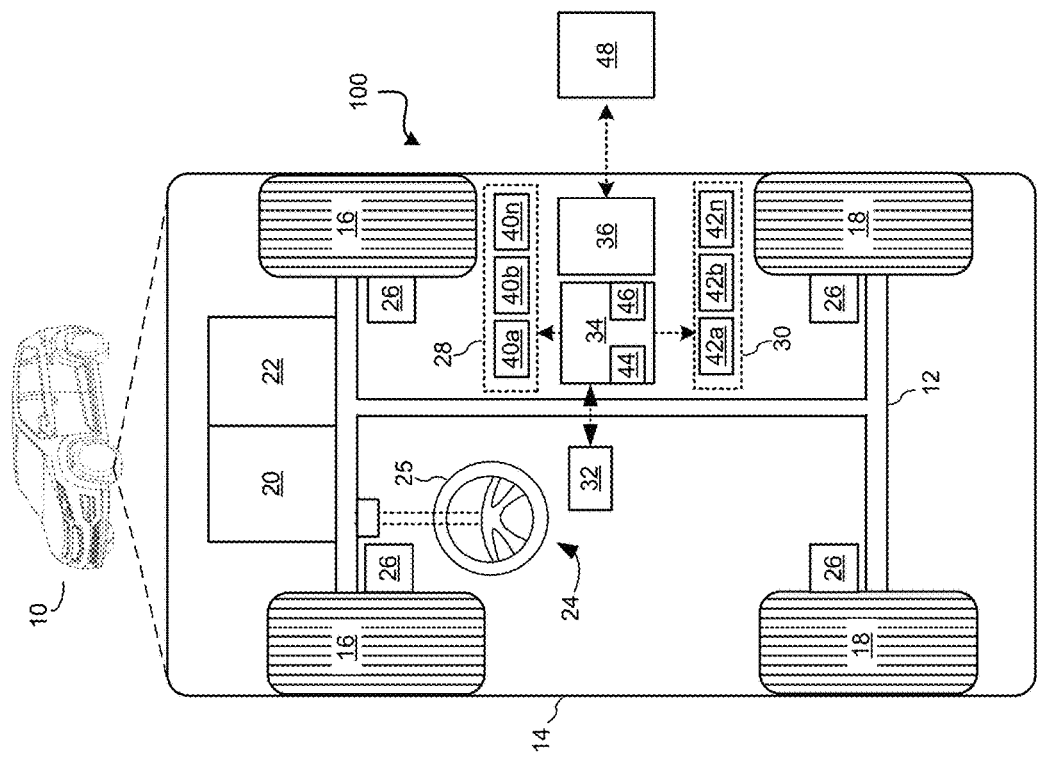
FIG. 1 is a functional block diagram illustrating an autonomous vehicle including a traffic control personnel detection system, in accordance with various embodiments.

With reference to FIG. 1, a traffic control personnel detection system shown generally as 100 is associated with a vehicle 10 in accordance with various embodiments. In general, traffic control personnel detection system (or simply "system") 100 allows for detection and classification of traffic control personnel and related signage (such as "slow", "stop", and/or "turn" traffic control signs) and control of the vehicle based thereon.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the traffic control personnel detection system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants). Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement the traffic control personnel detection system 100 as discussed in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
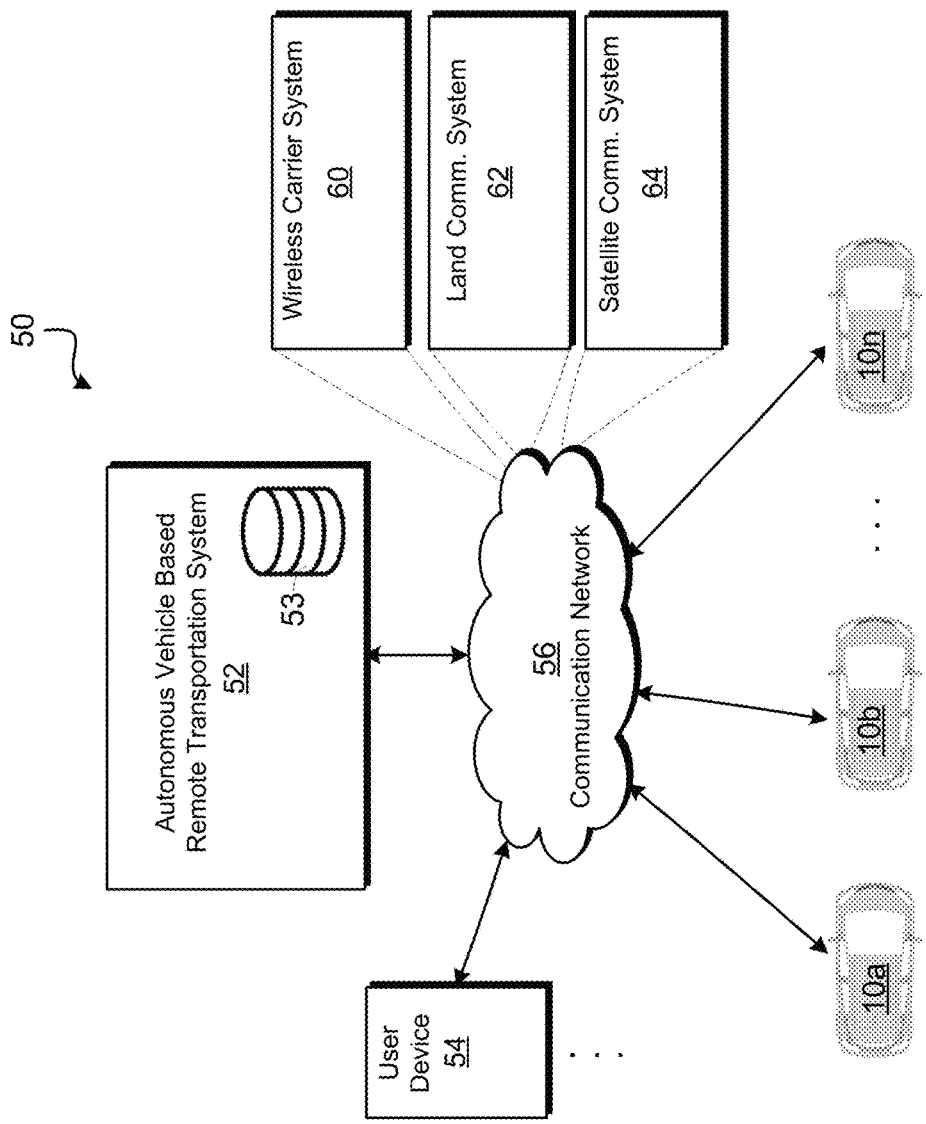
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1, and which may include a database 53 for storing various data generated in accordance with various embodiments. The operating environment 50 (all or a part of which may correspond to entities 48 shown in FIG. 1) may further include one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
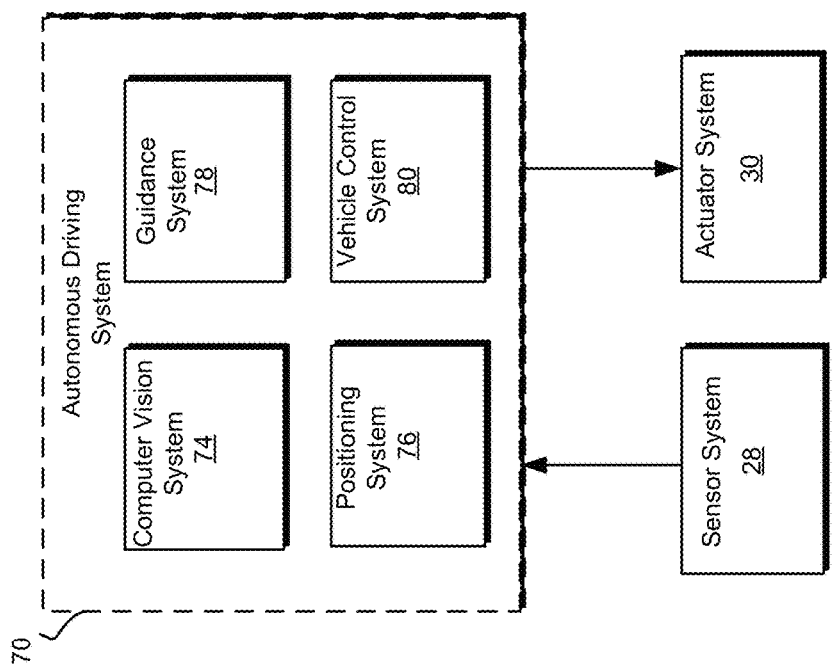
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. A variety of techniques may be employed to accomplish this localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like. Furthermore, various embodiments of the traffic control personnel detection system 100 according to the present disclosure may include any number of sub-modules embedded within the controller 34 which may be combined and/or further partitioned to similarly implement systems and methods described herein. Furthermore, inputs to the traffic control personnel detection system 100 may be received from the sensor system 28, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

As mentioned briefly above, traffic control personnel detection system (or simply "detection system") 100 of FIG. 1 is configured to detect the presence of a traffic control person and a traffic control sign in the vicinity of the traffic control person. The AV 10 may then be controlled appropriately—e.g., by remaining stationary a predetermined distance from the detected traffic control personnel and/or establishing a temporary stop point on its internal map.

Figure 5:
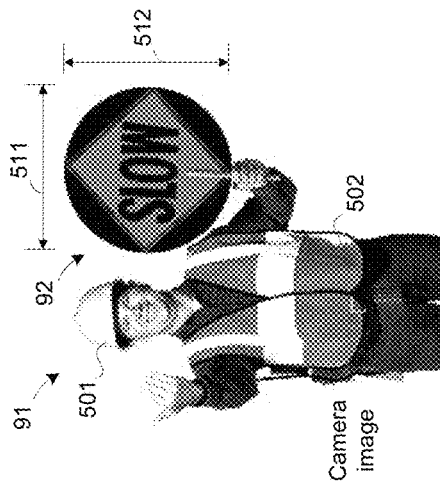
FIG. 5 illustrates an exemplary front camera view of a traffic control person holding a traffic control sign, in accordance with one embodiment.
Figure 4:
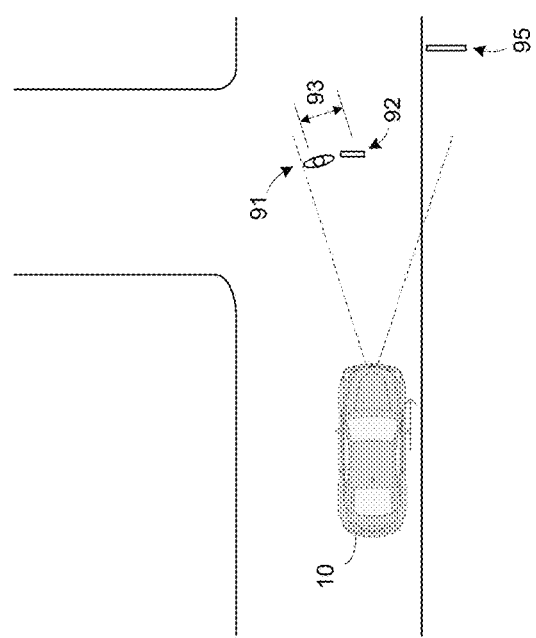
FIG. 4 is a top view of an exemplary autonomous vehicle approaching a traffic control person holding a traffic control sign, in accordance with one embodiment.

An example scenario in which the present subject matter may be understood is shown in FIG. 4, which presents a conceptual top-down view of an exemplary AV 10 approaching a traffic control person 91 holding a traffic control sign 92 at an intersection. FIG. 5 illustrates a front camera image that might be received by AV 10 as it approaches traffic control person 91 and traffic control sign 92. In this regard, the phrases "traffic control person" and "traffic control personnel" are used interchangeably herein, and generally refer to a human being (or a sufficiently anthropomorphic robot) engaged in directing traffic. The phrase "traffic control sign" refers to any object, such as a hand-held or portable sign, flat, or the like, bearing indicia (e.g., via its shape and/or text) intended to direct the flow of vehicle traffic. Such traffic control signs may include, for example, "stop" signs, "slow" signs, "turn" signs, and the like. The shape, reflectivity, size, text content, typeface, and other characteristics of such signs might be manufactured to comply with applicable regulations.

In accordance with various embodiments, and as described in further detail below, detection system 100 is generally configured to detect traffic control person 91 and traffic flow sign 92 based on the sensor data (e.g., optical camera data), then determine (e.g., via lidar sensor data) the position/orientation of these objects relative to each other to confirm the presence of an actual traffic control person 91 holding, or otherwise in control of, a traffic flow sign 92. This confirmation is performed to distinguish between the illustrated scenario and an alternate scenario in which a person (not a traffic control person) happens to be walking near a stationary traffic control sign, such as a sign 95 as shown in FIG. 4. Stated another way, detection system 100 is configured to use various heuristics to avoid false-positives.

Figure 8:
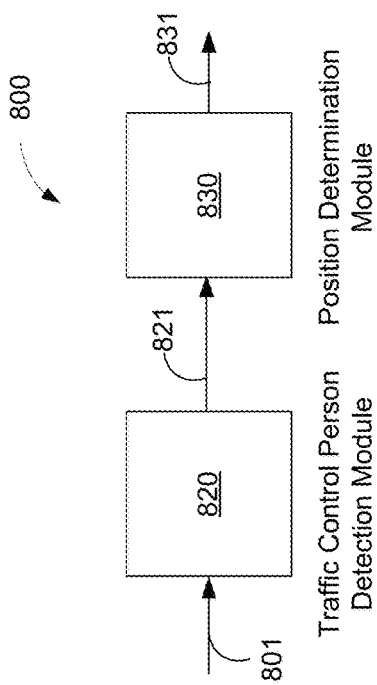
FIG. 8 is a dataflow diagram illustrating a traffic control personnel detection system of an autonomous vehicle, in accordance with various embodiments.

Referring now to FIG. 8, a traffic control personnel detection system (or simply "system") 800 generally includes a traffic control person detection module (or simply "detection module") 820 and a position determination module 830. Detection module 820 is generally configured to receive sensor data input 801 (e.g., from a front-facing optical camera and/or a lidar sensor) and produce an output 821 indicative of whether a traffic control person and/or a traffic control sign has been detected in the vicinity of AV 10. In one embodiment, as described in further detail below, output 821 is a vector of likelihood values corresponding to individual objects as determined by a neural network or other machine learning model.

Position determination module 830 is generally configured to assess the spatial distance between traffic control person 91 and traffic control sign 92 as well as the relative orientation of traffic control sign 92 relative to traffic control person 91 (and/or AV 10). Position determination module 830 produces an output 831 confirming (or not confirming) that traffic control person 91 and traffic control sign 92 are indeed intended to direct traffic in the vicinity of AV 10.

Figure 6:
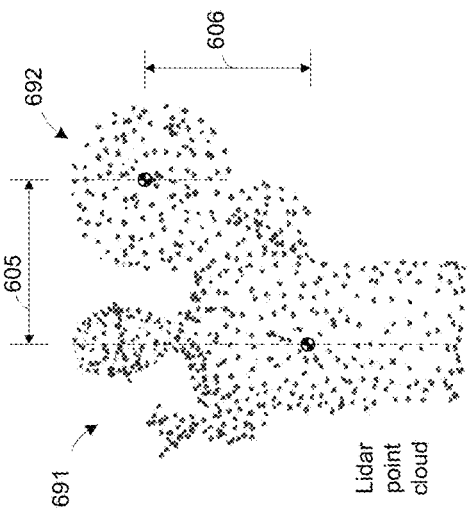
FIG. 6 illustrates a lidar point cloud corresponding to the front camera view illustrated in FIG. 5.

Position determination module 830 may use any suitable sensor data from sensor system 28, such as lidar and/or radar data. Referring to FIG. 6 in conjunction with FIGS. 4 and 5, for example, lidar sensor data in the form of lidar point clouds of a traffic control person (691) and traffic control sign (692) may be used to determine a lateral distance 605, a vertical distance 606, and an orientation between the two objects (e.g., the apparent centroids of the two objects). The lidar sensor data may be used to compute a surface normal extending from the surface of traffic control sign 92 or otherwise determine the orientation of traffic control sign 92.

Figure 7:
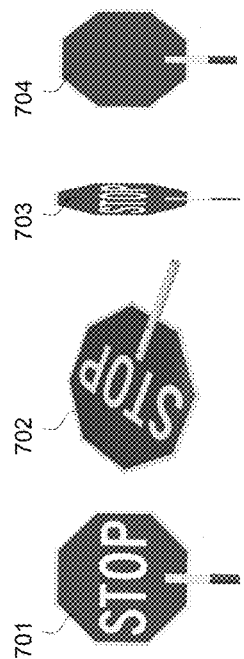
FIG. 7 illustrates various sign orientations useful in training a machine learning model, in accordance with various embodiments.

The position determination module 830 may use a variety of criteria to confirm the validity of traffic control person 91 and traffic control sign 93. For example, if the distance 605 is less than some predetermined threshold, detection system 100 may then confirm the presence of the traffic control person 91 and traffic control sign 92. The distance 606 (i.e., the height of traffic control sign 92 relative to traffic control person 91) may also be used to make this assessment. In some embodiments, the pose of the traffic control sign 92 (see, e.g., FIG. 7) may also be assessed to determine whether the traffic control sign 92 is intended to be acted on by AV 10 (i.e., facing toward rather than away from AV 10). The pose may be inferred, for example, by looking at the ratio of the distances 511 and 512 shown in FIG. 5. That is, for signage known to be circular or a regular polygon, the ratio of those distances would be expected to be close to 1.0 when sign 92 is substantially facing oncoming AV 10. Similarly, referring briefly to FIG. 7, module 830 might determine that traffic control sign 701 is more likely to be intended for AV 10 if it appears to be held like sign 701, rather than sign 702 (held at an oblique upward angle), sign 703 (held upright at close to a 90-degree angle), or sign 704 (held facing substantially the opposite direction).

In the illustrated embodiment of FIG. 6, point cloud centroids are used to compute distances 604 and 606; however, the range of embodiments are not so limited. Any number of other scalar measurements may be used to determine whether what has been observed by detection module 820 is actually a human traffic control person 91 holding or otherwise in control of a traffic control sign 92. It will be understood that position determination module 830 need only perform this assessment in the event that detection module produces an output 821 that, within some level of confidence, is consistent with the presence of both a traffic control person 91 and a traffic control sign 92.

Figure 9:
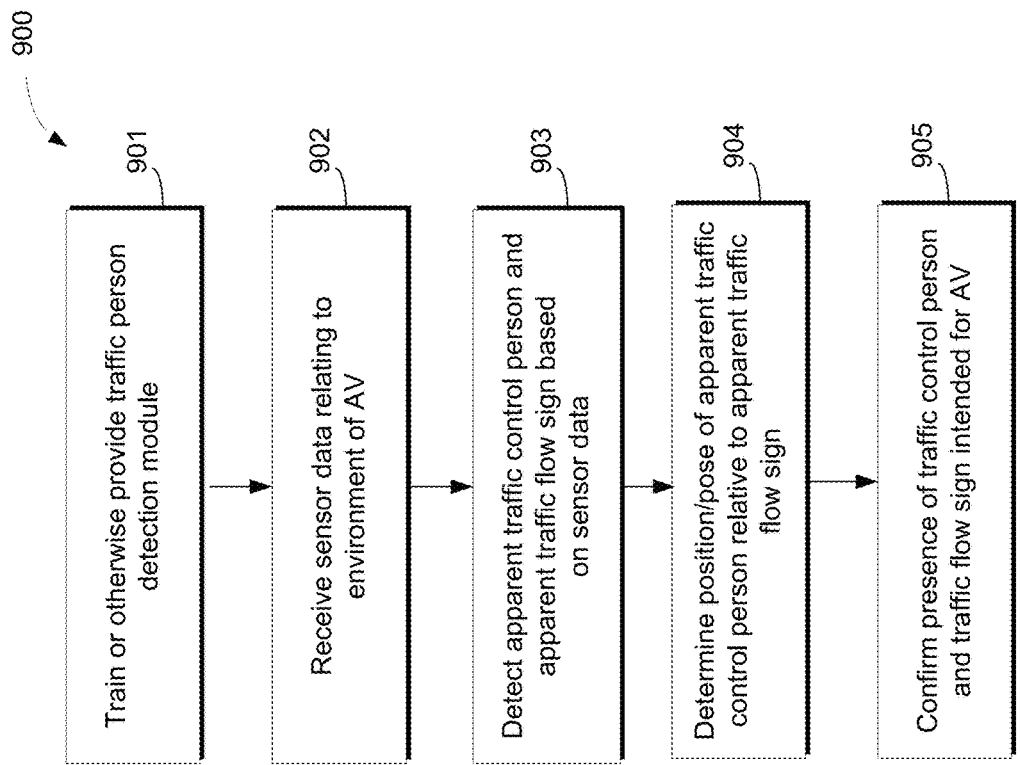
FIG. 9 is a flowchart illustrating a control method for controlling the autonomous vehicle, in accordance with various embodiments.

Referring now to FIG. 9, and with continued reference to FIGS. 1-8, the illustrated flowchart provides a control method 900 that can be performed by traffic control personnel detection system 100 in accordance with the present disclosure. As can be appreciated in light of the disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of autonomous vehicle 10.

In various embodiments, the method begins at 901, in which traffic control person detection module (or simply "detection module") 820 is trained or otherwise provided. In one embodiment, as described in further detail below, detection module 820 is implemented as a machine learning classifiers, such as a convolutional neural network (CNN) that is trained via supervised learning using a corpus of known images of traffic control personnel and related signage (such as hand-held "stop" and "slow" signs). In one embodiment, training relating to individual classes (e.g., "traffic control person", "stop sign", "slow sign") is performed independently, rather than in composite (i.e., as training images containing multiple classes of these objects). It will be appreciated that a typical traffic control person, such as traffic control person 91, may have a distinctive appearance due to, for example, the presence of a reflective vest 502, a safety helmet 501, and the like.

Next, at 902, AV 10 receives sensor data, from sensor system 28, relating to the environment in the vicinity of AV 10. Such sensor data might include, for example, optical camera data, lidar sensor data, and/or radar sensor data, as described above. At 803, detection module 720 detects a traffic control person and a traffic control sign based on the sensor data and the model trained or otherwise provided at 901.

Once it has been determined that both a traffic control person 91 and a traffic control sign 92 has been detected, position determination module 730 then calculates, at 904, the position and orientation of the detected traffic control sign 92 relative to the traffic control person 91. These measurements may be performed using, for example, lidar or sensor data.

Finally, at 905, position determination module 830 confirms the validity of the traffic control person 91 and traffic control sign 92 based in part on their relative positions and orientations as determined at 904. For example, position determination module 830 can determine whether a lateral distance between the two objects (e.g., distance 605 in FIG. 6) is in the range of a typical human holding a sign in one hand, and/or that the height of the sign relative to the human is also reasonable (e.g., not too close to the ground and not above the reasonable reach of a human being). The absolute orientation of traffic control sign 92 can also be considered, as described above in connection with FIG. 7. In one embodiment, position determination module 830 is implemented as a machine learning classifier trained to take a plurality of inputs (e.g., lateral distance between sign and human, height of sign, orientation of sign relative to AV 10, pose of sign, etc.) and produce a binary logistic output indicating the probability that traffic control person 91 and traffic control sign 92 are valid—i.e., an actual traffic control person holding an actual traffic control sign intended to be acted upon by AV 10, rather than a false-positive indicator. In some embodiments, the presence of the traffic control person and the traffic control sign may be transmitted over a network to a server, such as server 52 of FIG. 2.

As mentioned briefly, the various modules and systems described above may be implemented as one or more machine learning models that undergo supervised, unsupervised, semi-supervised, or reinforcement learning. Such models might be trained to perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), and linear discriminant analysis models.

In some embodiments, training of the machine learning models (e.g., for modules 820 and 830 of FIG. 8) occurs within a system remote from vehicle 10 (e.g., system 52 in FIG. 2) and is subsequently downloaded to vehicle 10 for use during normal operation of vehicle 10. In other embodiments, training occurs at least in part within controller 34 of vehicle 10 itself, and the trained model is subsequently shared with external systems and/or other vehicles in a fleet (such as depicted in FIG. 2). Training data may similarly be generated by vehicle 10 or acquired externally, and may be partitioned into training sets, validation sets, and test sets prior to training.

Figure 10:
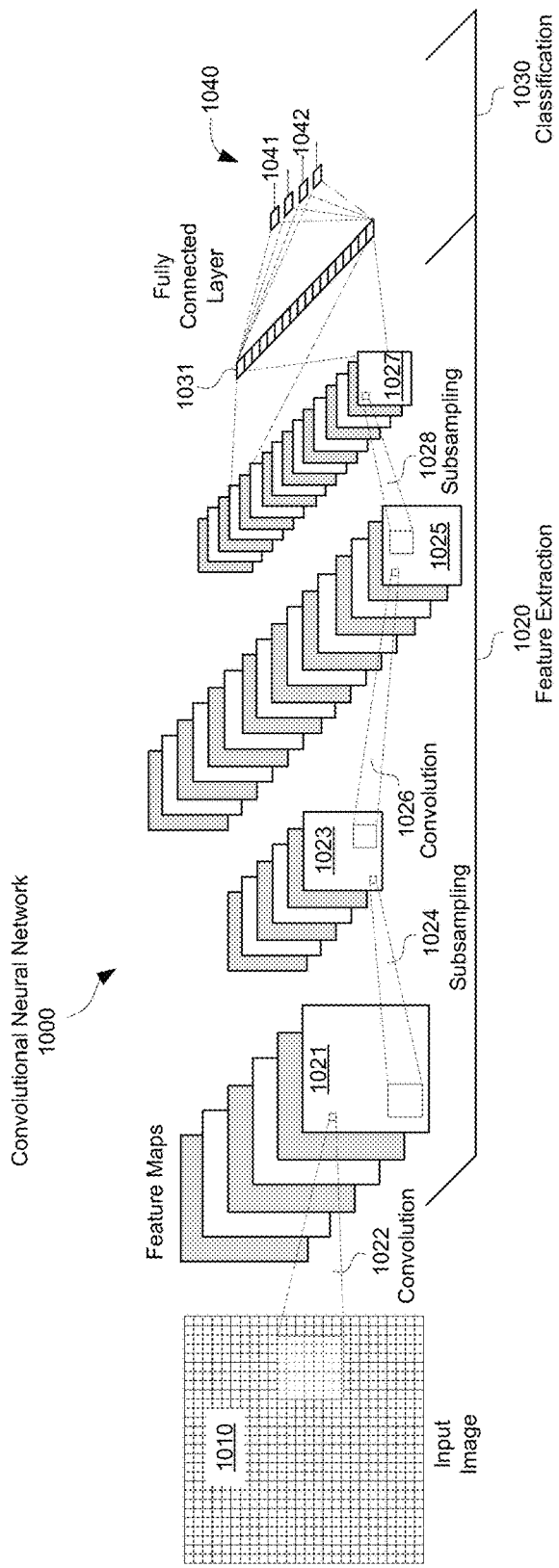
FIG. 10 illustrates an example convolutional neural network (CNN) in accordance with various embodiments.

In accordance with one embodiment, detection module 820 of FIG. 8 is implemented as a convolutional neural network (CNN). Referring now to FIG. 10, a CNN 1000 generally receives an input image 1010 (e.g., an optical image of the environment from sensors 28 of AV 10, as shown in FIG. 5) and produces a series of outputs 1040 associated with whether and to what extent a traffic control person and/or a traffic control sign is recognized within the input image 1010. In that regard, input 1010 will be referred to without loss of generality as an "image," even though it might in fact include a variety of sensor data types.

In general, CNN 1000 includes a feature extraction phase 1020 and a classification phase 1030. Classification phase 1030 includes a convolution 1020 that uses an appropriately sized convolutional filter to produce a set of feature maps 1021 corresponding to smaller tilings of input image 1010. As is known, convolution as a process is translationally invariant—i.e., features of interest (signage, human beings) can be identified regardless of their location within image 1010.

Subsampling 1024 is then performed on feature maps 1021 to produce a set of smaller feature maps 1023 that are effectively "smoothed" to reduce sensitivity of the convolutional filters to noise and other variations. Subsampling might involve taking an average or a maximum value over a sample of the inputs 1021. Feature maps 1023 then undergo another convolution 1026, as is known in the art, to produce a large set of smaller feature maps 1025. Feature maps 1025 are then subsampled (1028) to produce feature maps 1027.

During the classification phase (1030), the feature maps 1027 are processed to produce a first layer 1031, followed by a fully-connected layer 1033, from which outputs 1040 are produced. Outputs 1040 generally include a vector of probabilities associated with objects recognized in input image 1010. For example, output 1041 might correspond to the likelihood that a traffic control person (such as traffic control person 91 in FIG. 5) has been recognized, output 1042 might correspond to the probability that a 'slow' sign 92 has been recognized, and output 1043 might correspond to the probability that a 'stop' sign 701 has been recognized. Thus, for example, the outputs 1041-1043 produced by applying an image 1010 similar to that shown in FIG. 5 might be a vector of real numbers [0.92, 0.90, 0.02], corresponding to a 92% chance of a traffic control person, 90% chance of a traffic control sign, and 2% chance of a "slow" sign.

In general, the CNN 1000 illustrated in FIG. 1000 may be trained (step 901 in FIG. 9) in a supervised mode by presenting it with a large number (i.e., a "corpus") of labeled (i.e., pre-classified) input images (1010) including a range of traffic control personnel and signs. Backpropagation is then used to refine the training of CNN 1000. The resulting model is then implemented within module 820 of FIG. 8. Subsequently, during normal operation, the trained CNN 1000 is used to process images 801 received as AV 10 moves through its environment and observes possible traffic control personnel and traffic control signs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A traffic control detection method comprising:
   receiving sensor data relating to an environment associated with a vehicle;
   determining, by a processor, that a traffic control person and a traffic control sign are present within the environment based on the sensor data;
   determining, by the processor, a lateral position and a vertical position between the traffic control sign and the traffic control person based on centroid data determined from lidar point cloud data;
   determining, by the processor, an orientation of the traffic control sign relative to the traffic control person based on a surface normal computed from a determined surface of traffic control sign;
   determining, by the processor, whether the traffic control person and the traffic control sign are valid based on the determined lateral position, the vertical position, and the orientation; and
   controlling, by the processor, the vehicle based on the determined validity.

2. The method of claim 1, wherein determining that the traffic control person and the traffic control sign are present within the environment includes presenting the sensor data to a previously trained machine learning classifier.

3. The method of claim 2, wherein the machine learning classifier is a convolutional neural network.

4. The method of claim 2, wherein the machine learning classifier is trained using labeled images traffic control individuals, hand-held "stop" signs, and hand-held "slow" signs.

5. The method of claim 1, wherein the determining whether the traffic control person and the traffic control sign are valid includes determining whether the lateral distance between the traffic control person and the traffic control sign is below a predetermined threshold.

6. The method of claim 1, wherein the determining whether the traffic control person and the traffic control sign are valid includes determining a pose of the traffic control sign relative to the vehicle.

7. The method of claim 1, wherein the determining whether the traffic control person and the traffic control sign are valid includes determining whether the vertical is within a defined range.

8. A system for controlling a vehicle, comprising:
a processor; and
a non-transitory computer readable medium comprising:
a traffic control person detection module configured to, by the processor, receive sensor data relating to an environment associated with a vehicle and determine that a traffic control person and a traffic control sign are present within the environment based on the sensor data; and
a position determination module configured to, by the processor, determine a lateral position and a vertical position between the traffic control sign and the traffic control person based on centroid data determined from lidar point cloud data, determine an orientation of the traffic control sign relative to the traffic control person based on a surface normal computed from a determined surface of traffic control sign, and confirm that the traffic control person and the traffic control sign are valid based on the lateral position, the vertical position, and the orientation; and
a control module configured to, by the processor, control the vehicle based on the determined validity.

9. The system of claim 8, wherein the traffic control person detection module determines that the traffic control person and the traffic control sign are present within the environment by presenting the sensor data to a previously trained machine learning classifier.

10. The system of claim 9, wherein the machine learning classifier is a convolutional neural network.

11. The system of claim 9, wherein the machine learning classifier is trained using labeled images traffic control individuals, hand-held "stop" signs, and hand-held "slow" signs.

12. The system of claim 8, wherein the position determination module confirms that the traffic control person and the traffic control sign are valid in part by determining whether the lateral distance between the traffic control person and the traffic control sign is below a predetermined threshold.

13. The system of claim 8, wherein the position determination module confirms that the traffic control person and the traffic control sign are valid in part by determining a pose of the traffic control sign relative to the vehicle.

14. The system of claim 8, wherein the position determination module confirms that the traffic control person and the traffic control sign are valid in part by determining the vertical distance between the traffic control sign and the traffic control person is within a range.

15. An autonomous vehicle, comprising:
at least one sensor that provides sensor data; and
a controller that, by a processor and based on the sensor data:
receives sensor data relating to an environment associated with a vehicle;
determines that a traffic control person and a traffic control sign are present within the environment based on the sensor data;
determines a lateral position and a vertical position between the traffic control sign and the traffic control person based on centroid data determined from lidar point cloud data;
determines an orientation of the traffic control sign relative to the traffic control person based on a surface normal computed from a determined surface of traffic control sign;
confirms a validity of the traffic control person and the traffic control sign based on the lateral position, the vertical position, and the orientation; and
control the vehicle based on the confirmed validity.

16. The autonomous vehicle of claim 15, wherein traffic control person detection module determines that the traffic control person and the traffic control sign are present within the environment by presenting the sensor data to a convolutional neural network that has been trained by a set of labeled images of example traffic control signs and example traffic control people.

17. The autonomous vehicle of claim 15, wherein the validity of the traffic control person and the traffic control sign is determined by:
determining whether the lateral distance between the traffic control person and the traffic control sign is below a predetermined threshold;
determining a pose of the traffic control sign relative to the vehicle; and
determining whether the vertical distance between the traffic control person and the traffic control sign is within a range.

* * * * *